Feb. 26, 1929.
D. M. CUTSHAW
1,703,263
DUSTPROOF VALVE STRUCTURE FOR PNEUMATIC WHEELS
Filed July 16, 1928
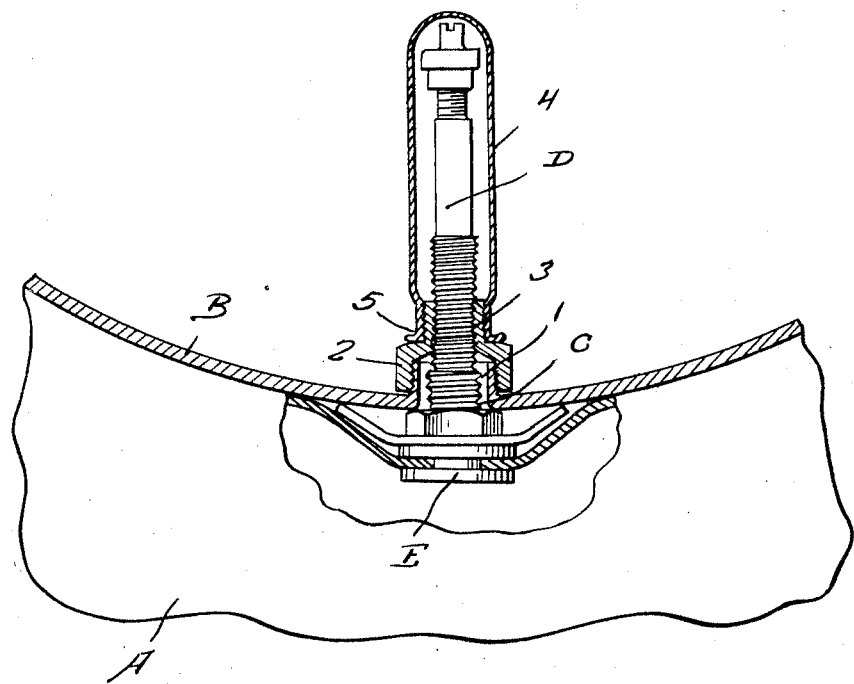
Inventor
D. M. Cutshaw,
By Clarence A. O'Brien
Attorney Patented Feb. 26, 1929.

1,703,263

UNITED STATES PATENT OFFICE.

DANIEL MONROE CUTSHAW, OF GREENEVILLE, TENNESSEE.

DUSTPROOF VALVE STRUCTURE FOR PNEUMATIC WHEELS.

Application filed July 16, 1928. Serial No. 292,990.

The present invention pertains to improvements in the art of pneumatic wheels and has a more particular reference to a dust proof valve structure for pneumatic wheels.

The invention aims to provide a novel structure wherein complementary means between the usual wheel rim and the threaded valve body will serve efficiently to prevent the entrance of foreign matter between the rim and the inner tube of the wheel structure.

The scraping and quick deterioration of inner tubes is frequently the result of fine particles of sand and even water which have found their way into the wheel usually around the valve body.

The prime object of the invention is to provide dust proofing means for pneumatic wheels without departing materially from the present wheel structure now in general use.

Another important object of the invention is to provide water and sand proofing means for pneumatic wheels which can be applied to conventional wheels after but a slight modification thereof.

Still another object is to provide such means as aforementioned of such simple construction as to require no additional cost to the purchasing public.

After reading the following specification and claims, other important objects and advantages of the invention will become apparent.

In the drawings:

The single figure represents fragmentarily and in longitudinal section a pneumatic inner tube equipped with a conventional valve body, while the structure forming the present invention is shown in longitudinal sectional view and in secured relation to the rim.

Referring to the drawings, wherein like numerals designate like parts, a conventional inner tube is fragmentarily shown and designated in the drawings, by A. A conventional rim B is formed with the usual valve opening C. A valve body D of the usual exterior threaded construction is secured to the inner tube A, in the usual manner designated by E. The threaded portion of the valve body is adapted to project through the valve opening C in the usual manner.

The structure embodying the present invention includes an externally threaded collar 1, outstanding at the inner side of the rim B, and disposed around the valve opening C. The threaded valve body D is adapted to project through said collar in spaced relation therewith.

A sleeve 2 is formed with an enlarged threaded opening whereby the sleeve may be engaged over the threaded collar 1 in the manner shown in the drawing.

The sleeve 2 is also provided with an externally threaded reduced extension 3, which is also formed with an internally reduced threaded bore for threaded engagement with the external threads of the valve body D.

A dust cap 4 is reduced at its open end and internally threaded for engagement with the external threads of the reduced portions 3 of the sleeve.

In assembling, the present novel valve structure, the valve body D is inserted through the valve opening in the rim, in the usual manner. The sleeve 2 is then threaded inwardly on the valve body and subsequently threaded onto the externally threaded collar 1. In this position, no space exists between the valve body and the edge portion of the opening C, through which foreign matter may enter. The valve cap 4 may then be threaded onto the reduced portion of the sleeve 2, in the manner shown in the drawings.

It is to be understood that certain changes in the specific shape, size and materials may be resorted to, in the manufacture of this invention, without departing from the spirit of the invention or the scope of the appended claims.

Having thus described my invention, what is claimed as new is:

1. In a dust proof valve structure for pneumatic wheels wherein the rim is formed with a threaded hollow protuberance around the usual valve opening, a sleeve reduced at one end, said reduced end being internally and externally threaded, the opposite end of said sleeve being enlarged and formed with an enlarged threaded opening adapted for engagement over the protuberance on the rim, the usual valve body being adapted to engage through the reduced portion of the sleeve while external threads of said reduced portion are adapted to receive a suitable dust cap.

2. In a dust proof valve structure for pneumatic wheels, in combination, a wheel rim having a valve opening formed therein, an outstanding threaded collar provided at the inner side of said rim and around said opening, an internally threaded sleeve for attachment to said collar, one end of said sleeve being reduced and formed with a reduced threaded bore, a threaded valve body having communication with the usual pneumatic tube and being adapted for threaded engagement through the reduced bore of the sleeve.

3. In a dust proof valve structure for pneumatic wheels, in combination, a wheel rim having a valve opening formed therein, an outstanding threaded collar provided at the inner side of said rim and around said opening, an internally threaded sleeve for attachment to said collar, one end of said sleeve being reduced and formed with a reduced threaded bore, a threaded valve body having communication with the usual pneumatic valve and being adapted for threaded engagement through the reduced bore of the sleeve, the reduced end of said sleeve being externally threaded to receive a suitable dust cap.

In testimony whereof I affix my signature.

DANIEL MONROE CUTSHAW.